J. E. Strode,
Grain Ventilator.

№ 62,233. Patented Feb. 19, 1867.

Witnesses
F. A. Jackson
Jas. A. Servid

Inventor
James E. Strode
Per Munn & Co
Attorneys

United States Patent Office.

JAMES E. STRODE, OF LITCHFIELD, ILLINOIS.

Letters Patent No. 62,233, dated February 19, 1867.

IMPROVEMENT IN GRAIN DRYER.

The Schedule referred to in these Letters Patent and making part of the same.

TO ALL WHOM IT MAY CONCERN:

Be it known that I, JAMES E. STRODE, of Litchfield, in the county of Montgomery, and State of Illinois, have invented a new and improved Grain Ventilating and Drying Apparatus; and I do hereby declare that the following is a full, clear, and exact description thereof, which will enable those skilled in the art to make and use the same, reference being had to the accompanying drawings, forming part of this specification, in which—

Figure 1:
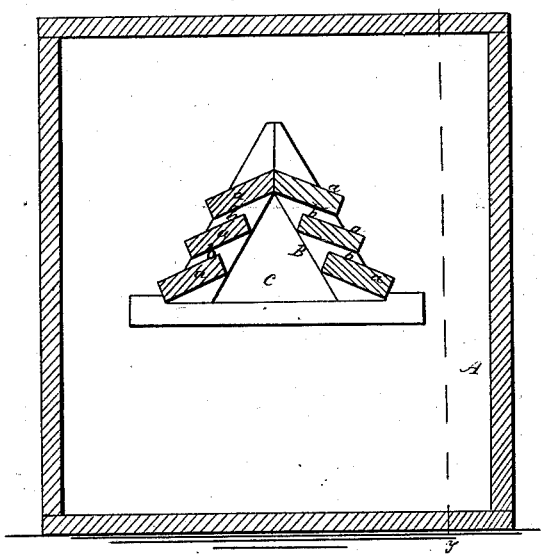
Figure 2:
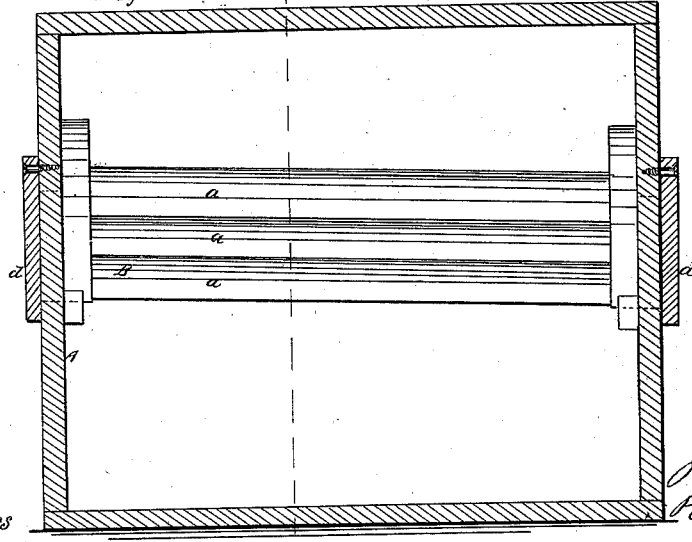

Figure 1 is a vertical section of my invention taken in the line $x\,x$, fig. 2.

Figure 2, a vertical section of the same taken in the line $y\,y$, fig. 1.

Similar letters of reference indicate corresponding parts.

This invention relates to a new and improved apparatus for ventilating and drying grain stowed away in bulk, and consists in having one or more air-ducts passing through the bin, box, or granary, in which the grain is placed, said duct or ducts being composed of slats arranged one above the other with spaces between, with openings in the sides of the bin, box, or granary for the admission of air into the duct or ducts, as hereinafter fully shown and described, whereby the grain will be thoroughly ventilated and dried.

A represents a bin, box, or granary, in which the damp grain is stowed or placed in bulk, and B is an air-duct, of inverted v-form in its transverse section, that is to say, with an open bottom and inclined sides meeting at their upper edges, (see fig. 1.) The sides of the duct are composed of slats, $a$, placed one above the other, and inclined in their transverse section from their inner edges downward towards their outer edges, and spaces, $b$, are allowed between the slats for the escape of air from the duct. The duct extends entirely across the box, bin, or granary A, and is slightly inclined from a horizontal position, as shown in fig. 2, and in the sides of the bin, box, or granary there are made openings, $c$, of triangular form, corresponding to the form of the ends of the duct and in line therewith, said openings being provided with doors or covers, $d\,d$. When these doors or covers $d$ are opened, air is admitted into the duct and escapes through the spaces $b$ between the slats $a$, and also escapes through the open bottom of the duct through the mass of grain, causing the same to be thoroughly ventilated and dried. The slats $a$, arranged as shown, admit of a very open duct, one which will produce a thorough ventilation, and which the grain cannot enter, or choke or clog up, as is the case frequently with perforated tubes which are used for the purpose.

Having thus described my invention, I claim as new, and desire to secure by Letters Patent—

The grain ventilator and dryer, consisting of the inclined slats $a$, with spaces, $b$, between them, when constructed and arranged as herein set forth and for the purpose specified.

JAMES E. STRODE.

Witnesses:
   GEO. W. LINDER,
   JOHN WM. STRODE.